US 6,563,802 B2

(12) United States Patent
Hayward

(10) Patent No.: US 6,563,802 B2
(45) Date of Patent: *May 13, 2003

(54) ECHO CANCELLATION WITH DYNAMIC LATENCY ADJUSTMENT

(75) Inventor: Roger D. Hayward, Beaverton, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/102,098

(22) Filed: Jun. 22, 1998

(65) Prior Publication Data

US 2002/0012324 A1 Jan. 31, 2002

(51) Int. Cl.[7] .................................................. H04B 3/20
(52) U.S. Cl. ................... 370/286; 370/287; 379/406.01; 455/570
(58) Field of Search .................................. 370/286, 287; 379/410, 411, 406.01; 375/102; 455/570

(56) References Cited

U.S. PATENT DOCUMENTS

| 4,411,006 A | * | 10/1983 | Horna | 375/102 |
| 4,481,385 A | * | 11/1984 | Kaifs | 179/170.2 |
| 4,527,020 A | * | 7/1985 | Ito | 179/170.2 |
| 4,682,358 A | * | 7/1987 | Werner | 379/411 |
| 4,777,633 A | * | 10/1988 | Fletcher et al. | 370/50 |
| 4,803,648 A | * | 2/1989 | Dierckx et al. | 364/724 |
| 4,825,459 A | * | 4/1989 | Farrow et al. | 379/3 |
| 4,972,467 A | * | 11/1990 | Nakagawa et al. | 379/411 |
| 4,989,221 A | * | 1/1991 | Qureshi et al. | 375/8 |
| 4,995,030 A | * | 2/1991 | Helf | 370/32.1 |
| 5,309,484 A | * | 5/1994 | McLane et al. | 375/106 |
| 5,317,596 A | * | 5/1994 | Ho et al. | 375/14 |
| 5,335,194 A | * | 8/1994 | Clayton et al. | 364/724.1 |
| 5,398,029 A | * | 3/1995 | Toyama et al. | 341/61 |
| 5,659,609 A | * | 8/1997 | Koizumi et al. | 379/410 |
| 5,684,792 A | * | 11/1997 | Ishihara | 370/286 |
| 5,784,361 A | * | 7/1998 | Bielsker | 370/286 |
| 5,835,486 A | * | 11/1998 | Davis et al. | 370/287 |
| 6,057,789 A | * | 5/2000 | Lin | 341/61 |
| 6,064,733 A | * | 5/2000 | Hayashi | 379/410 |
| 6,078,645 A | * | 6/2000 | Cai et al. | 379/3 |
| 6,208,671 B1 | * | 3/2001 | Paulos et al. | 370/545 |
| 6,240,128 B1 | * | 5/2001 | Banerjea et al. | 375/222 |
| 6,266,367 B1 | * | 7/2001 | Strait | 375/229 |
| 6,320,902 B1 | * | 11/2001 | Nafie et al. | 375/228 |

OTHER PUBLICATIONS

B. Wang and T. Adali. Joint Impulse Response Shortening for Discrete Multitone Systems. Global Telecommunications Conference—Globecom'99. 1999 IEEE. pp. 2508–2512.*

* cited by examiner

Primary Examiner—Hassan Kizou
Assistant Examiner—Joe Logsdon
(74) Attorney, Agent, or Firm—Kenyon & Kenyon

(57) ABSTRACT

An echo cancellation system measures an average delivery rate of a reference data signal and an average capture rate of an input data signal. From the measured data rates, the system converts the reference data signal to a domain of the input data signal. An echo canceler cancels an echo that may be present in the input data signal based upon the converted reference data signal.

14 Claims, 2 Drawing Sheets

ECHO CANCELLATION WITH DYNAMIC LATENCY ADJUSTMENT

BACKGROUND

The present invention relates to an improved echo canceler for use with drivers of varying clock rates.

Echo cancellation is known per se. For example, in a speaker phone, echo cancellation prevents sound that is emitted from an omni-directional speaker and captured by a nearby microphone from returning to the signal's source and interfering with communication. Consider an example where a first party speaks to a second party located at the speaker phone. When the first party speaks, the party's voice is broadcast from the speaker phone. Not only is the first party's voice heard by the second party, but the voice also is captured by the speaker phone's microphone. The voice signal reflects off of various surfaces, for example walls, ceilings, furniture and people. The reflected signal is captured by the microphone at some time delayed from the time that the signal was emitted by the speaker. If the reflected signal is not eliminated from the aggregate input signal, the reflected speech signal may be perceived as an annoying echo when delivered to the first party.

Echo cancelers, as the name implies, eliminate the echo generated by the reflected signals. Typically, they do so by buffering a copy of the output audio signal at the speaker phone. The echo canceler monitors the input signal from the microphone and identifies when and how the reflected signal appears in the input signal. When a reflected signal is identified, the processor generates an inverted replica of the reflected signal from the buffered signal and applies it to the input signal. When applied in a correct timing relationship, the replica cancels the reflected signal.

Echo cancelers appear in a variety of applications beyond merely speaker phones. For example, they may be used in video conferencing equipment. In all known echo cancelers, the output speaker equipment and the input microphone equipment are driven by a single clock source. The single clock source permits the correct timing relationship to be maintained between the buffered output signal (the source of the replica) and the captured input signal. Speaker and microphone equipment are not driven by independent clocks because drift among them would prevent the echo canceler from establishing and maintaining the correct timing relationship between the replica and reflected signals.

It is anticipated that computer systems such as personal computers and/or network computers may include hardware that enables telecommunication or video conferencing. However, such computer systems may provide independent speaker and microphone equipment, each with it own clock. Even if the clocks had the same ideal clock rate, echo cancellation heretofore could not be provided for such a system because drift among the two clocks would impair the operation of the echo canceler. Echo cancellation certainly could not be provided for a system where speaker and microphone equipment possessed independent clocks with different clock rates.

Accordingly, there is a need in the art for an echo canceler that is suitable for use with independently clocked input and output devices.

SUMMARY

The present invention provides improved echo cancellation in which an average delivery rate of a reference data signal and an average capture rate of an input data signal are measured. From the measured data rates, the reference data signal is converted to a domain of the input data signal and input to an echo canceler. The echo canceler cancels an echo that may be present in the input data signal based upon the converted reference data signal.

DETAILED DESCRIPTION

Embodiments of the present invention provide an echo canceler that dynamically adapts to clocking differences between input and output drivers. In an embodiment, dynamic latency adjustments are made based upon a first measured rate at which output data is drained from the system and a second measured rate at which input data is captured by the system. By averaging the input and output rates and comparing them, an average skew rate is identified. An adjustable sample rate converter converts a reference signal from a time domain of the output drivers to a time domain of the input driver. The converted reference signal is input to an echo canceler with the captured input signal.

In a second embodiment, the measured rates of data drain and data capture define a target amount of data that should be buffered by the echo canceler. The echo canceler defines high and low thresholds surrounding this target amount. If the actual amount of data that is buffered falls outside of either threshold, the echo canceler adjusts the data rate conversion to compensate.

Figure 1:
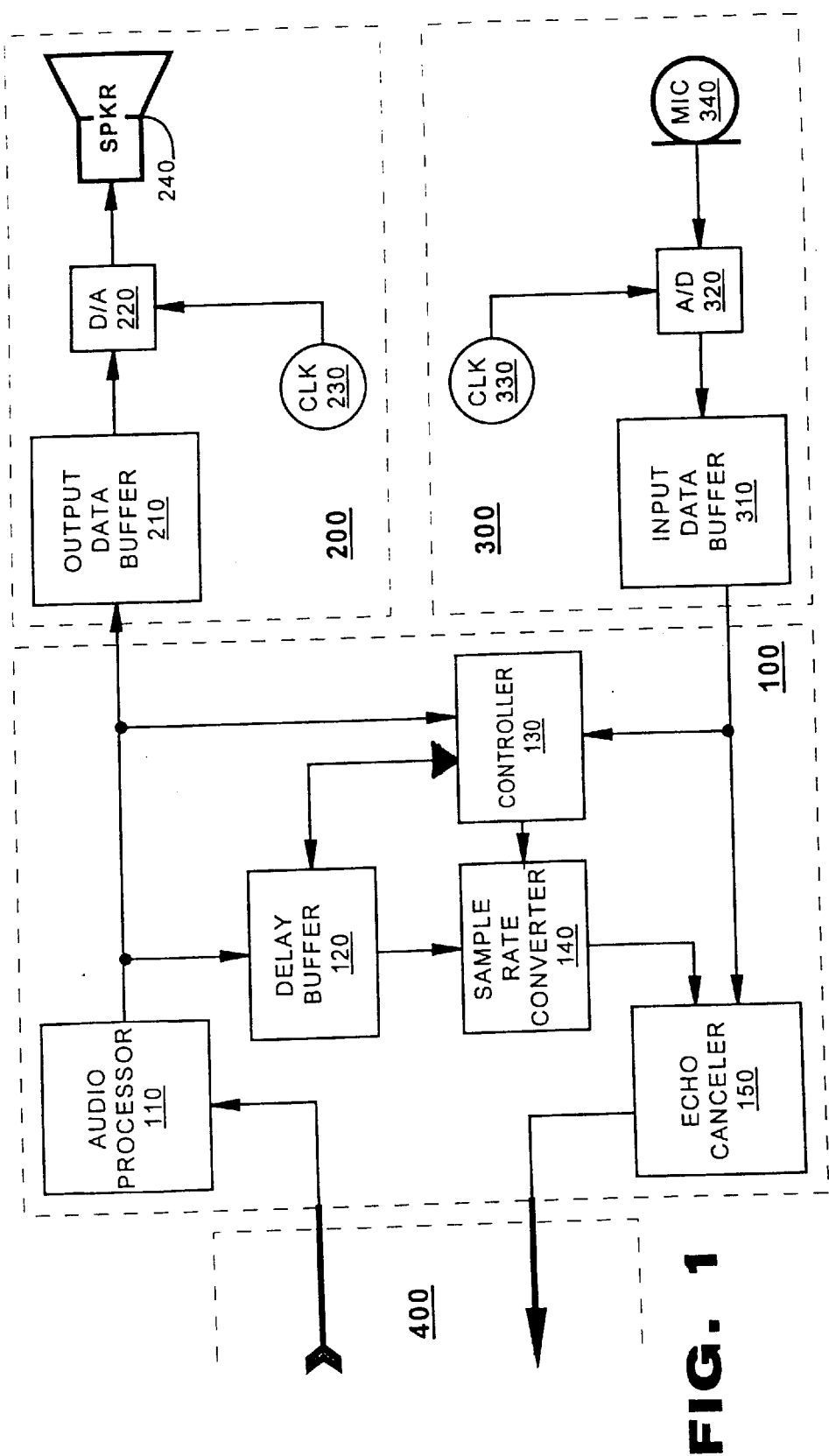
FIG. 1 is a block diagram of an echo canceler constructed in accordance with an embodiment of the present invention.

FIG. 1 illustrates an echo canceling system ("ECS") 100 constructed in accordance with an embodiment of the present invention. The ECS 100 interconnects a speaker system 200 and a microphone system 300 with a main system 400. The main system 400 is the source of data to be output by speaker system 200. The main system 400 also receives data captured by the microphone system 300.

The ECS 100 may be populated by an audio processor 110, a delay buffer 120, a controller 130, a sample rate converter 140 and an echo canceler 150. The audio processor 110 receives a signal, called "the reference signal," from the main system 400. It creates a copy of the reference signal and stores the copy in the delay buffer 120. The audio processor 110 also forwards the reference signal to the speaker system 200 without delay. Optionally, the audio processor 110 may be omitted from the embodiment of FIG. 1. The reference signal will be output by the speaker system 200.

The delay buffer 120 stores the reference signal for later use by the echo canceler 150. A sample rate converter 140 drains the reference signal from the delay buffer 120 at a predetermined rate and converts it from a first time domain, the time domain of the speaker system 200, to a second time domain, the time domain of the microphone system 300. The sample rate converter 140 outputs a microphone-domain representation of the reference signal to the echo canceler 150. The echo canceler 150 also receives a captured input signal from the microphone system 300. Using the microphone-domain reference signal, the echo canceler 150 performs echo cancellation on the captured input signal.

The controller 130 is coupled to an input of the speaker system 200 and an output of the microphone system 300.

The controller 130 observes the transmission of data from the main system 400 to the speaker system 200. It also monitors transmission of data from the microphone system 300 to the main system 400 (via the echo canceler 150). Based upon the data rate of output by the speaker system 200 and rate of data capture by the microphone system 300, the controller 130 determines the differences in clock rates between the speaker system 200 and the microphone system 300. The controller 130 causes the sample rate converter 140 to implement a conversion rate that reflects the operational differences between the speaker system 200 and the microphone system 300.

Figure 2:
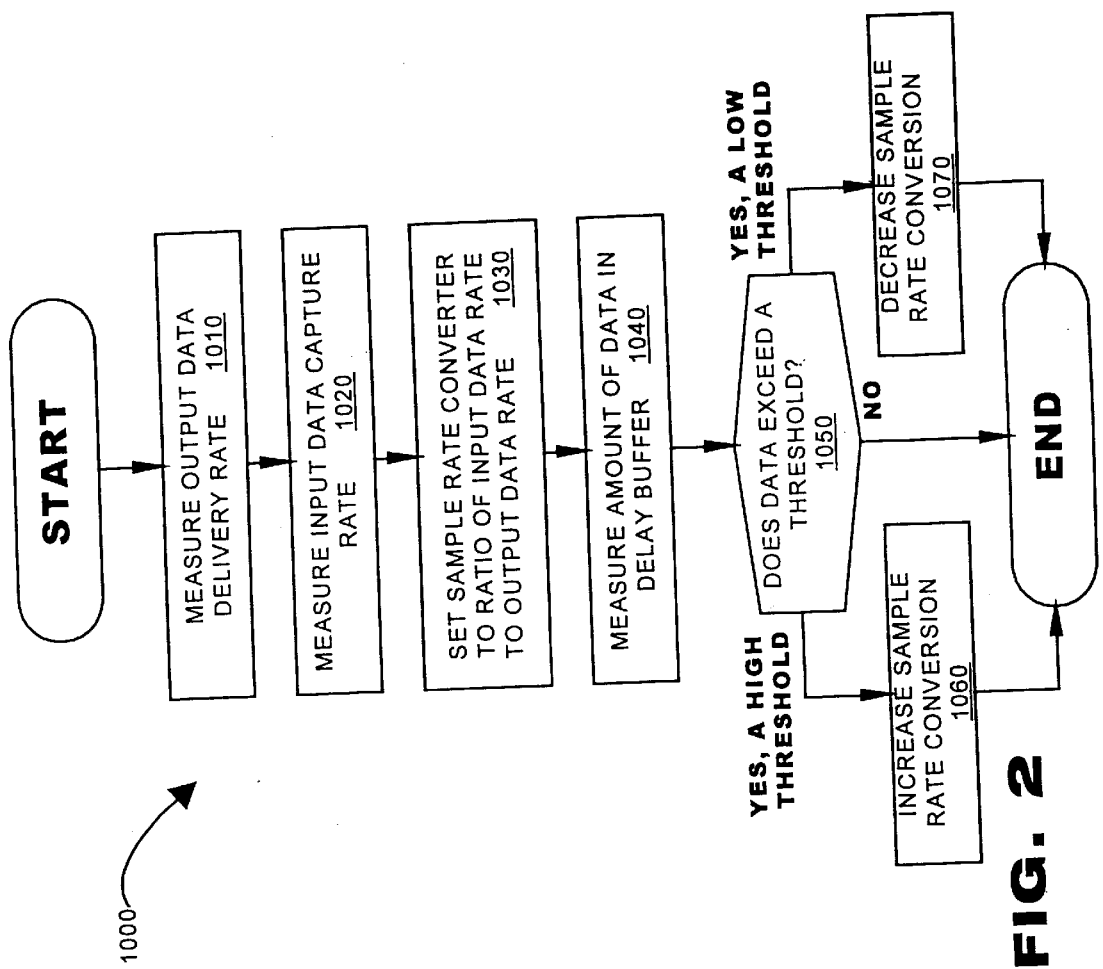
FIG. 2 is a flow diagram of a method of operation of an embodiment of the present invention.

FIG. 2 illustrates a method of operation 1000 of the ECS 100 in accordance with an embodiment of the present invention. The ECS 100 measures an average rate of data delivery to the speaker system 200 (Step 1010). It also measures an average rate of data capture by the microphone system 300 (Step 1020). Based upon the rates of data delivery and data capture, the ECS 100 causes the reference signal to be converted to the domain of the input signal (Step 1030). In a first embodiment, the sample rate converter 140 may be programmed based solely upon the relative input and output data rates.

In a second embodiment, the method 1000 also includes identifying local instability. Based on long-term averages of the output data rates and input data rates, the ECS 100 determines a target amount of data (D) that should be buffered in the delay buffer 120 (Step 1040). The controller 130 may identify an amount of data actually present in the delay buffer 120 and compare it to the target amount D (Step 1050). If the true amount of data exceeds the target amount D by more than a predetermined threshold, the ECS 100 may increase the conversion rate applied by the sample rate converter 140 (Step 1060). If the target amount D exceeds the true amount of data be more than a predetermined threshold, the ECS 100 may decrease the conversion rate applied by the sample rate converter 140 (Step 1070). And, if the true amount of data is within a predetermined margin established around the target D, no change need be made to the conversion rate.

In an embodiment, the method 1000 may be repeated periodically. For example, the method 1000 may be initiated after observing average rates of data capture and data drain over an initial 2–5 second time period. Based upon the average data rates, the sample rate converter 140 is engaged with an initial rate conversion. By repeating the method 1000 on a periodic basis, say every 30 seconds, the initial rate conversion may be refined.

As is known, clocks exhibit slight fluctuations over long periods of time. Thus a 44.1 KHz clock, may operate at a first, clock rate (say, 44.102 KHz) during a first time interval, than operate at a second, slightly decreased clock rate (say, 44.098 KHz) during a second time interval. Skew between this first clock and a second independent clock, one that exhibits its own fluctuations over time, does not remain constant. Embodiments that periodically repeat the method 1000 automatically account for such fluctuations.

A better understanding of the operation of the present invention may be obtained through an example of the ECS 100 integrated in a specific system. Consider a first example where the ideal clock rates of both the speaker system 200 and the microphone system 300 should be identical, say 44.1 Kilosamples/second ("Ks/s"). However, an acceptable margin for clock error may be ±0.05%. Consequently, the two systems 200, 300 may operate at a relative clock differential of as much as 44 samples/second.

A typical speaker system 200 may include an output data buffer 210, a digital to analog converter ("D/A") 220, a clock generator 230 and a speaker 240. Data received from the main system 400 is stored in the output data buffer 210. The D/A 220 drains data from the output data buffer 210 at a rate determined by the clock 230, converts the data to an analog signal and drives the speaker 240 with it.

A typical microphone system 300 may include an input data buffer 310, an analog to digital ("ND") converter 320, a clock generator 330 and a microphone 340. The microphone 340 captures sound and generates an analog signal therefrom. The A/D 320 converts the analog signal to a digital signal at a sampling rate determined by the clock 330. The digital signal is loaded into the input data buffer 310. The input data buffer 310 outputs a captured input signal to the ECS 100.

In the first example above, the speaker system 200 may drain data at 44.122 Ks/s (44.1 Ks/s+0.05%) and the microphone system 300 may capture data at 44.078 Ks/s (44.1 Ks/s−0.05%). If a traditional echo canceler were used, one that includes only a delay buffer 120 and an echo canceler 150, the clock differential between the two systems 200, 300 would cause reference signal data to be input to the delay buffer 120 at a faster rate than it could be output to the echo canceler 150. Eventually, the delay buffer 120 would overflow or the echo canceler 150 would lose the necessary timing relationship between the captured input signal and the reference signal stored in the delay buffer 120. In either case, the echo canceler 150 would cease to function. The echo would remain in the captured signal. By contrast, the conversion rate established by the sample rate converter 140 of the ECS 100 permits echo cancellation to occur despite any operational difference between the clocks 230, 330.

Consider a second example where the ideal clock rates of the speaker system 200 and the microphone system 300 are different. For example, voice signals in telecommunications applications traditionally are sampled at an 8 Ks/s rate. However, in a given application, audio data may be presented to the speaker system 200 at a second data rate, such as 44.1 Ks/s. A traditional echo canceler could not operate on data signals having markedly different data rates. However, the ECS 100 of the present invention operates successfully on these two data signals. In an embodiment, the sample rate converter 140 may be preprogrammed to convert the reference signal from the ideal 44.1 KHz rate to an ideal 8 Khz rate. Subsequent operation of the method 1000 would refine the conversion rate to actual data rates used by the speaker and microphone systems 200 and 300.

In practice, particularly where the ECS 100 is used with speaker systems 200 and microphone systems 300 that possess data buffers 210, 310, exchange of data to and from the main system 400 may occur in high-rate bursts rather than as a continuous stream of data. As is known in computer applications, audio data may be organized into data packets, each packet containing data representing audio over a predetermined period of time (say, 10 ms). Often, a main system 400 multiplexes data exchange with other functions. The packets are stored in the output data buffer 210 and drained from the buffer 210 at a constant rate determined by the clock 230. Similarly, the microphone system 300 may accumulate captured input data at a steady rate as determined by the clock 330 but may deliver the packets to the main system 400 in high rate bursts.

In a bursty system as described, the clock rates of the speaker system 200 and/or the microphone system 300 are not determined from short-term observation of the data delivery rates to or from the main system 400. Consider an example where packets define audio data for a 10 ms interval. On any given 10 ms interval, the main system 400 may issue a high rate burst of packets that fills the output data buffer 210. The observed data rate greatly exceeds the rate of clock 230. However, during subsequent 10 ms intervals, the main system 400 would not issue additional packets to the speaker system 200. Considered in isolation, no 10 ms interval accurately represents the rate of clock 230. In a bursty system, the controller 130 considers the average delivery rate of data to the speaker system 200 (and, also an average data rate from the microphone system 300) to calculate a conversion rate of the sample rate converter 140. For example, where a data packet defines a 10 ms interval, the traffic controller 130 may identify the average data rates over an interval of 2–5 seconds.

The ECS 100 may be implemented in hardware or software. That is, the audio processor 110, delay buffer 120, controller 130, sample rate converter 140 and echo canceler 150 may be provided as hardware elements in, for example, an integrated circuit such as an application specific integrated circuit. Alternatively, the ECS 100 may be a "software machine," constituting a general purpose processor or digital signal processor operating according to program instruction. In a software embodiment, FIGS. 1 and 2 illustrate the functionality of the ECS 100. Thus embodiments of the present invention permit echo cancellation to be performed on signals having different data rates or with input and output drivers that possess independent clocks. It should be appreciated that the ECS 100 of the present invention operates independently of the type of echo canceler 150 that is used. Any of a variety of echo cancelers may be used in the place of echo canceler 150 consistent with the teachings of the present invention.

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. An echo cancellation method, comprising:
   measuring a delivery rate of a reference data signal,
   measuring a capture rate of an input data signal,
   dynamically generating a replica of the reference data signal in a time domain of the input data signal based on periodic measurements of the delivery rate and the capture rate,
   inputting the generated replica of the reference data signal and the input data signal to an echo canceler.

2. The method of claim 1, wherein the reference data signal is formatted as a plurality of packets, each packet representing data over a predetermined time interval, and
   further wherein the first and second measuring steps respectively measure average rates over a plurality of the time intervals.

3. The method of claim 1, wherein the reference data signal includes audio data.

4. The method of claim 1, wherein the input data signal includes audio data.

5. The method of claim 1, further comprising initializing the generation step based upon an ideal delivery rate and an ideal capture rate.

6. A method of echo cancellation, comprising:
   measuring an average delivery rate of a reference data signal,
   measuring an average capture rate of an input data signal,
   generating a replica of the reference data signal in a time domain of the input data signal based upon the average delivery rate and the average capture rate,
   determining a target amount of data that should be buffered based on the average delivery rate and the average capture rate, and
   when an actual amount of buffered data deviates from the target amount, adjusting a rate of generation applied at the generating step
   inputting the input data signal and the generated replica of the reference data signal to an echo canceler.

7. The method of claim 6,
   wherein the reference data signal is delivered to an output device as a plurality of packets, each packet representing audio data of a predetermined time interval, and
   further wherein the first and second measuring steps respectively measure average rates over a plurality of the time intervals.

8. The method of claim 6, further comprising, before generating the replica, buffering the reference data signal.

9. The method of claim 6, wherein, when the actual amount of buffered data exceeds the target amount, the rate of generation is increased.

10. The method of claim 6, wherein, when the actual amount of buffered data is less than the target amount, the rate of generation in decreased.

11. A computer readable medium on which are stored program instructions that, when executed in a computer system, cause the computer to perform the following steps:
   measure an average delivery rate of a reference data signal,
   measure an average capture rate of an input data signal,
   generate a replica of the reference data signal in a time domain of the input data signal based upon the average delivery rate and the average capture rate,
   determine a target amount of data that should be buffered based on the average delivery rate and the average capture rate,
   when an actual amount of buffered data deviates from the target amount, adjust a rate of generation applied at the generating step,
   input the input data signal and the generated replica of the reference data signal to an echo canceler.

12. A method of echo cancellation, comprising:
   measuring an average delivery rate of a reference data signal,
   measuring an average capture rate of an input data signal,
   converting the reference data signal to a time domain of the input data signal using a ratio of the average delivery rate to the average capture rate,
   determining a target amount of data that should be buffered based on the average delivery rate and the average capture rate, and
   when an actual amount of buffered data deviates from the target amount, adjusting a rate of conversion applied at the converting step inputting the input data signal and the converted reference data signal to an echo canceler.

13. The method of claim 12, wherein, when the actual amount of buffered data exceeds the target amount, the rate of conversion is increased.

14. The method of claim 12, wherein, when the actual amount of buffered data is less than the target amount, the rate of conversion in decreased.

* * * * *

UNITED STATES PATENT AND TRADEMARK OFFICE
CERTIFICATE OF CORRECTION

PATENT NO. : 6,563,802 B2
DATED : May 13, 2003
INVENTOR(S) : Roger D. Hayward

It is certified that error appears in the above-identified patent and that said Letters Patent is hereby corrected as shown below:

Column 5,
Line 51, delete "wherein the first and second measuring steps" and insert
-- wherein measuring the delivery rate and measuring the capture rate --;
Lines 58 and 59, delete "initializing the generation step" and insert
-- initializing the dynamic generation of the replica of the reference data signal --;

Column 6,
Lines 6 and 7, delete "applied at the generating step" and insert -- applied when generating the replica of the reference data signal, --;
Line 14, delete "further wherein the first and second measuring steps" and insert
-- further wherein measuring the average delivery rate and measuring the average capture rate --;
Line 28, delete "perform the following steps" and insert -- perform the following: --;
Line 41, delete "applied at the generating step" and insert -- applied when the replica of the reference data signal is generated, --;

Signed and Sealed this

Nineteenth Day of July, 2005

JON W. DUDAS
*Director of the United States Patent and Trademark Office*